(12) United States Patent
Hensiek

(10) Patent No.: US 11,459,045 B1
(45) Date of Patent: Oct. 4, 2022

(54) CONTINUOUS CONTACT RUB RAIL

(71) Applicant: Matthew William Hensiek, Great Bend, KS (US)

(72) Inventor: Matthew William Hensiek, Great Bend, KS (US)

(73) Assignee: Doonan Specialized Trailer, LLC, Great Bend, KS (US)

( * ) Notice: Subject to any disclaimer, the term of this patent is extended or adjusted under 35 U.S.C. 154(b) by 0 days.

(21) Appl. No.: 17/192,682

(22) Filed: Mar. 4, 2021

Related U.S. Application Data

(60) Provisional application No. 62/986,941, filed on Mar. 9, 2020.

(51) Int. Cl.
| | |
|---|---|
| *B62D 65/02* | (2006.01) |
| *B23P 19/00* | (2006.01) |
| *B23P 11/00* | (2006.01) |
| *B62D 63/08* | (2006.01) |
| *B60R 19/02* | (2006.01) |

(52) U.S. Cl.
CPC ........... *B62D 63/08* (2013.01); *B62D 65/024* (2013.01); *B23P 11/00* (2013.01); *B23P 19/00* (2013.01); *B60R 19/02* (2013.01); *Y10T 29/49826* (2015.01)

(58) Field of Classification Search
CPC ...... B62D 63/08; B62D 65/024; B60R 19/02; B23P 11/00; Y10T 29/49826
See application file for complete search history.

(56) References Cited

U.S. PATENT DOCUMENTS

| | | | | |
|---|---|---|---|---|
| 3,171,944 | A * | 3/1965 | Linnander | B23K 9/188 219/137 R |
| 4,064,810 | A * | 12/1977 | Jenkins | B61D 19/00 105/378 |
| 4,453,761 | A * | 6/1984 | Felburn | B60P 3/42 105/375 |
| 4,906,021 | A * | 3/1990 | Rowe | B62D 21/11 105/422 |
| 8,393,838 | B2 | 3/2013 | Plazek | |
| 10,155,544 | B2 | 12/2018 | Booher et al. | |
| 2008/0164723 | A1* | 7/2008 | Adams | B62D 25/2054 296/184.1 |
| 2009/0174171 | A1* | 7/2009 | Maiorana | B62D 27/065 280/423.1 |
| 2009/0260305 | A1* | 10/2009 | Haub | B62D 33/046 52/281 |
| 2010/0052228 | A1* | 3/2010 | Aschenbach | E02B 3/26 267/139 |
| 2010/0166502 | A1* | 7/2010 | DeMay | E02B 3/26 405/215 |
| 2011/0042637 | A1* | 2/2011 | Howard | E04H 17/1439 256/65.01 |
| 2013/0036960 | A1* | 2/2013 | Berman | B63B 59/02 114/219 |

* cited by examiner

*Primary Examiner* — Sarang Afzali
*Assistant Examiner* — Darrell C Ford
(74) *Attorney, Agent, or Firm* — Plager Schack LLP; Mark H. Plager; Naomi Mann

(57) ABSTRACT

A continuous contact rub rail system, comprising a rub rail having a vertical inner rail contact section that extends continuously along the length of the rub rail. The rub rail may be attached to the trailer deck frame, substantially without voids between the rub rail and deck frame, wherein the vertical inner rail contact section may be in continuous contact with the vertical outer wall of the trailer deck frame.

5 Claims, 4 Drawing Sheets

CONTINUOUS CONTACT RUB RAIL

RELATED APPLICATION

This application claims priority to provisional patent application U.S. Ser. No. 62/986,941 filed on Mar. 9, 2020, the entire contents of which is herein incorporated by reference.

BACKGROUND

The embodiments herein relate generally to rub rail systems for truck trailers.

Some conventional rub rails may easily bend when impacted by various objects, and/or may be difficult to repair if damaged, leaving trailers with damaged rub rails.

As such, there is a need in the industry for a rub rail system with improved strength that is easy to repair.

SUMMARY

Rub rails may be used for protection of a trailer against impact, and/or for holding devices used to secure cargo on the trailer bed, such as stakes, straps, and/or hooks. However, some conventional rub rails may easily bend when impacted by various objects, and/or may be difficult to repair if damaged, leaving trailers with damaged rub rails. For example, a traditional flat strap rub rail may comprise of a thin strip of material that may be bonded to spools and stake pockets attached to the side rail of the trailer deck frame. These may be weak and prone to bending when impacted. Some other hollow structure rub rails may be formed as an integral unit with the trailers side rail, making them difficult and costly to repair.

To address these problems, the disclosed subject matter provides a continuous contact rub rail system, comprising of a rub rail having a vertical inner rail contact section that extends continuously along the length of the rub rail. The rub rail may be attached to the trailer deck frame, without any voids between the rub rail and deck frame, wherein the vertical inner rail contact section may be in continuous contact with the vertical outer wall of the trailer deck frame.

In embodiments, the rub rail may have a hollowed frame "C" shaped configuration, wherein the inner rail contact section may comprise upper and lower vertical walls that may be welded to the vertical outer wall of the trailer deck frame.

In some embodiments, the rub rail may further comprise upper and lower horizontal sections, with openings for inserting stakes, hooks, and/or straps that may be used to secure a load onto the trailer deck. The disclosed rub rail may further comprise an outer section which may be a vertical wall coupled to the horizontal walls.

According to various embodiments, a rub rail method may comprise installing the rub rail along trailer deck frame by attaching the vertical wall of the inner rail contact section to the vertical outer wall of the trailer deck forming the deck frame by welding along a continuous length of the frame of the trailer deck. In some embodiments, the attachment may be made by horizontal welding.

The rub rail system thus provides a structure with increased strength and/or impact resistance to horizontal collisions, such as from a forklift during loading of the trailer. Additionally, the continuous contact of the rub rail may improve the vertical pull strength of the rub rail's connection to the trailer, which may be critical for certain load securement applications. Furthermore, installation and repair of the disclosed rub rail system is easy and cost effective.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
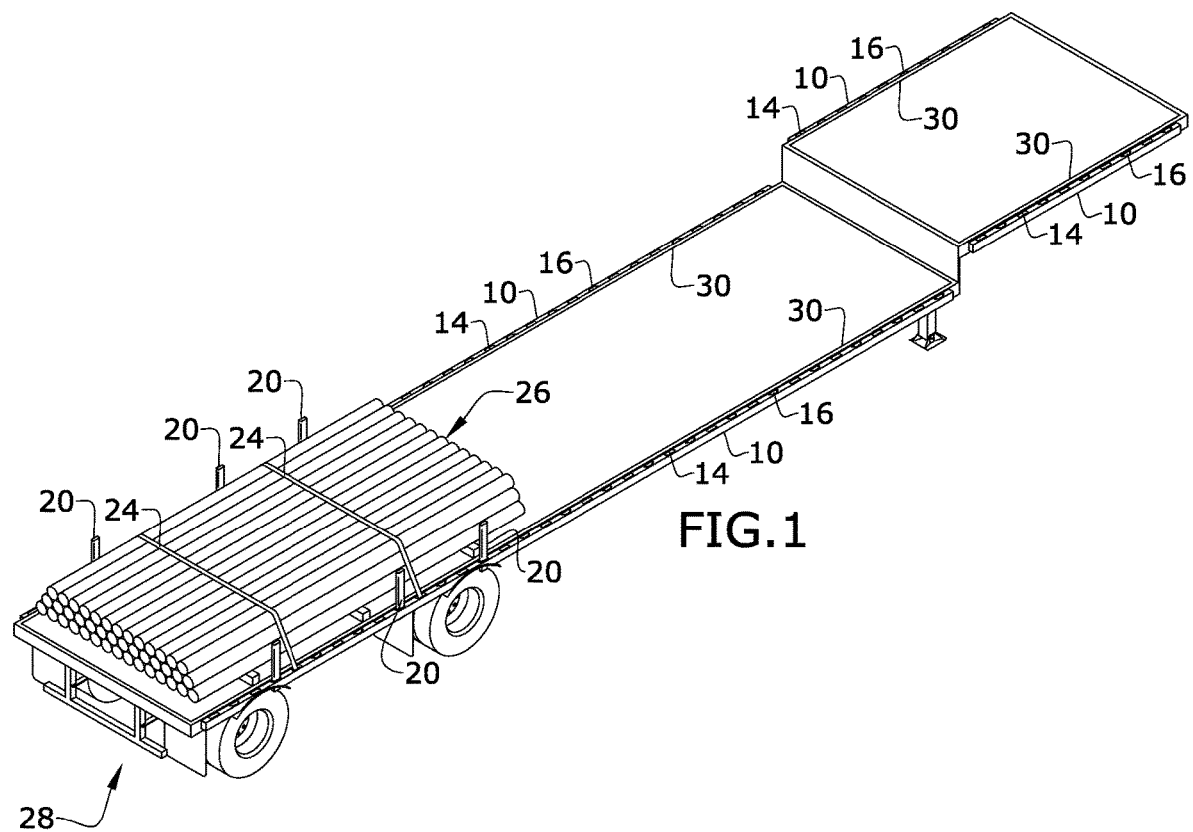
FIG. 1 depicts a perspective view of a continuous contact rub rail according to various embodiments, shown in use.
Figure 2:
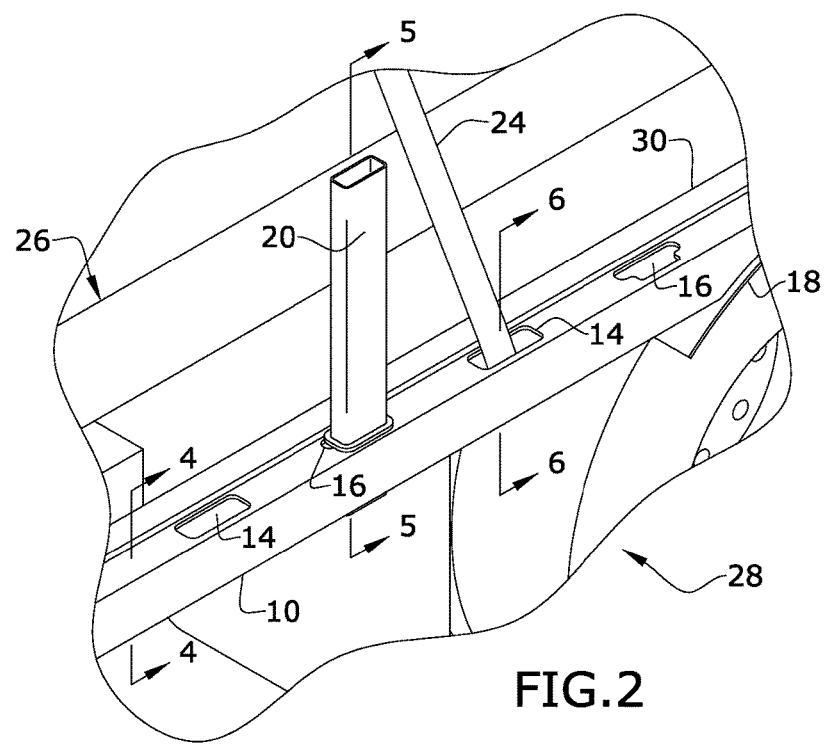
FIG. 2 depicts an enlarged perspective view of the continuous contact rub rail of FIG. 1.

According to various embodiments as depicted in FIG. 1, continuous contact rub rail(s) 10 may be attached to trailer deck frame 30 of trailer 28. Trailer 28 may be coupled to a vehicle such as a truck. Trailer 28 may be any type of trailer having at least one platform or deck on which cargo 26 may be placed.

Figure 4:
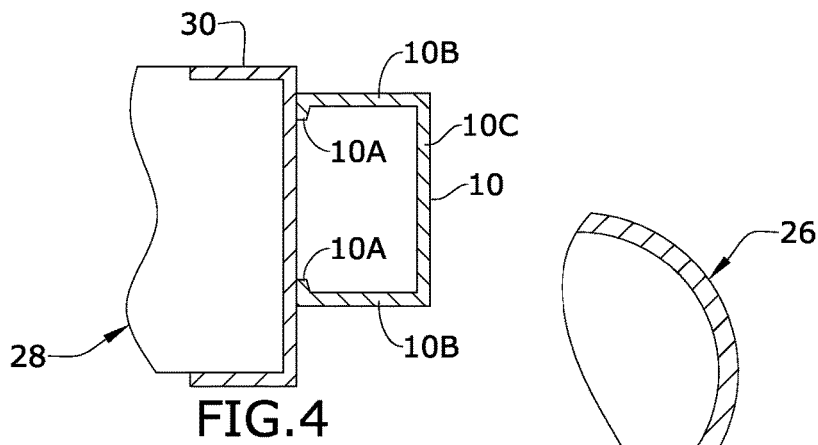
FIG. 4 is a section view taken along line 4-4 from FIG. 2, and shown without the pipe/cargo.
Figure 5:
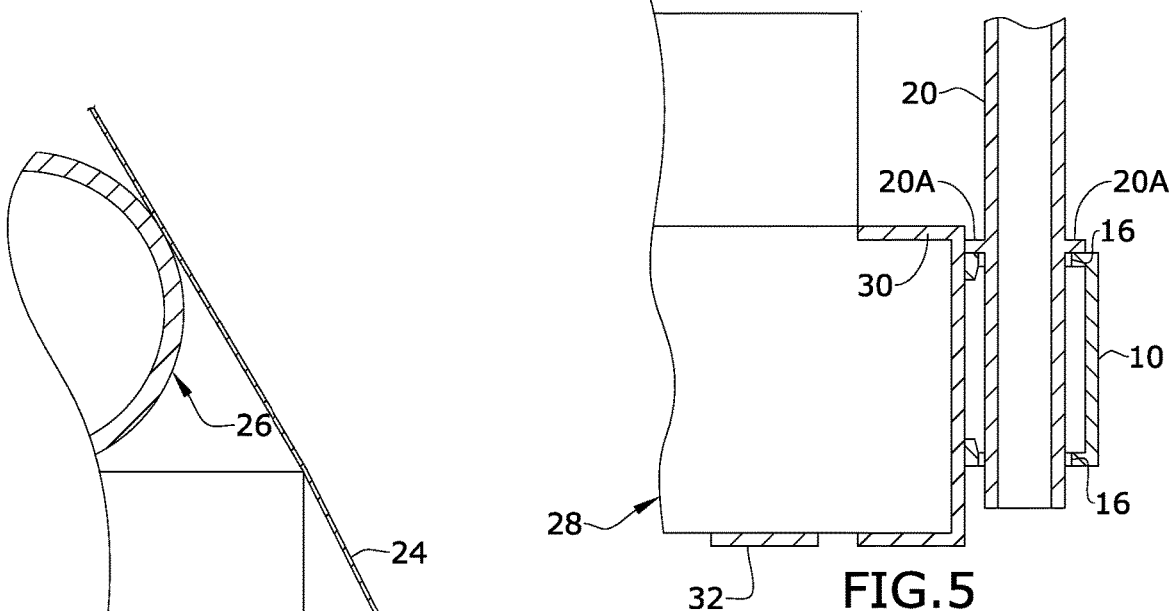
FIG. 5 is a section view taken along line 5-5 from FIG. 2.

In embodiments, as best depicted in FIG. 4, continuous rub rail 10 may comprise a generally hollowed body, including an inner rail contact section 10a. Rub rail 10 may further comprise a mid rail section 10b coupled to inner rail contact section 10a. Rub rail 10 may further comprise an outer rail section 10c coupled to mid rail section 10b. In embodiments, inner rail contact section 10a, mid rail section 10b, and outer rail section 10c may form an integral body, which may be a generally hollow frame.

In embodiments, trailer deck frame 30 may generally comprise a vertical outer wall formed around the trailer deck. Inner rail contact section 10a may be attached to trailer deck frame 30 by welding, or otherwise bonding inner contact section 10a directly to trailer deck frame 30. In embodiments, inner rail contact section 10a may be attached by horizontal welding to the deck frame, which may provide a stronger connection than circular welds used in some conventional rub rail systems. In embodiments, a single rub rail 10 may be attached along substantially the entire length ("L") of a side of the deck frame 30, or along a portion thereof. However, in some other embodiments, multiple rub rails 10 may be attached to fill the length of the deck frame, or portion thereof. Additionally, the attachment of contact section 10a to the deck frame may be a continuous contact attachment, substantially leaving no voids between contact section 10a and trailer deck frame 30.

Figure 3:
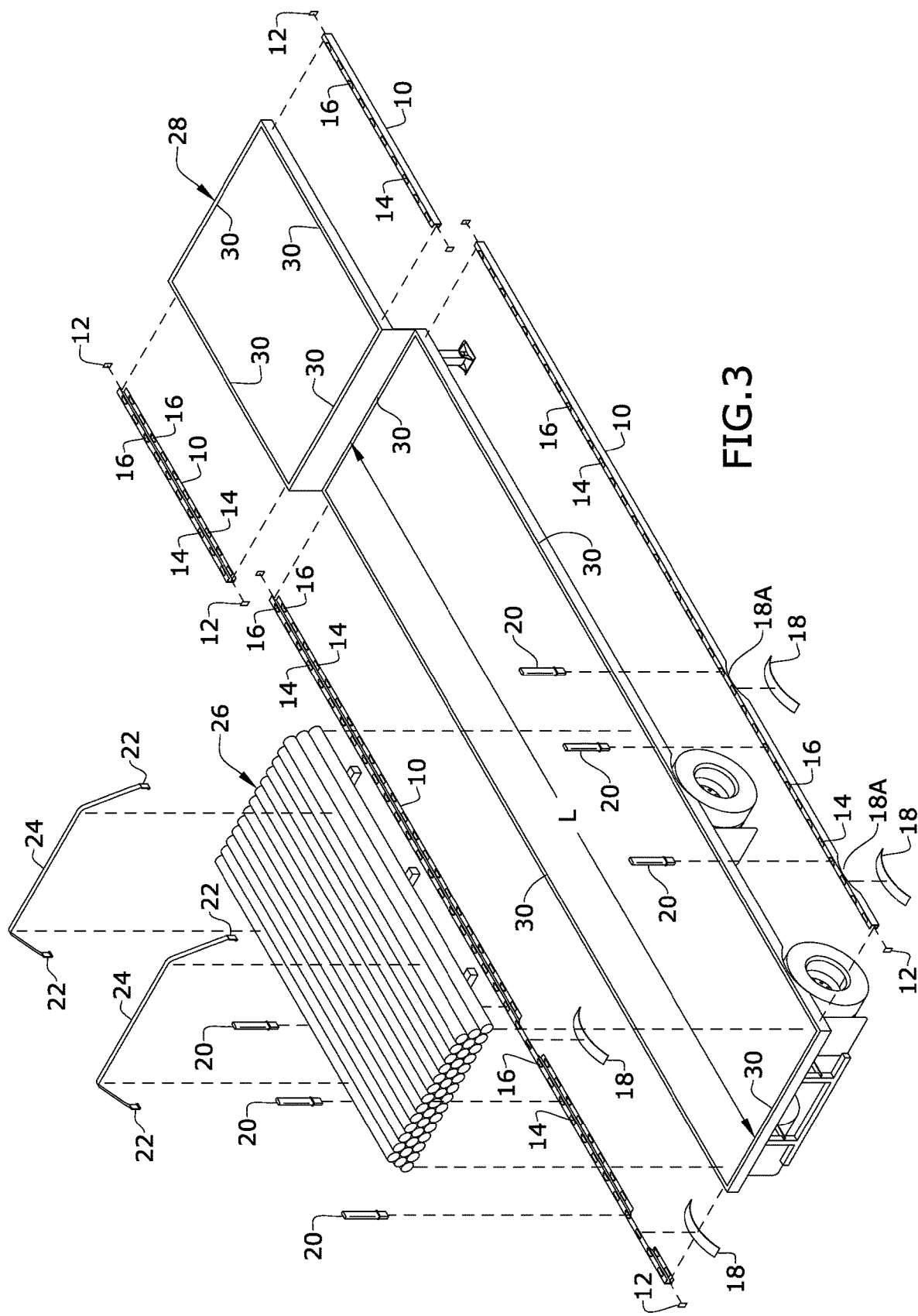
FIG. 3 depicts an exploded view of the continuous contact rub rail of FIG. 1.

In certain embodiments as best depicted in FIG. 3, rub rail(s) 10 may comprise rail fenders 18 which may be attached to the rub rail at fender cut outs 18a at the tire positions of the trailer. Additionally, rub rail(s) 10 may include end caps 12, which cover or cap off the ends of the rub rail.

In certain embodiments as best depicted in FIGS. 2, 3, and 5-8, mid rail section 10b may include cutouts or openings, which may be stake opening(s) 16, and/or strap hook opening(s) 14. However, in some embodiments, mid rail section 10b may not comprise any openings.

In embodiments, stake opening(s) 16 may be configured to receive stake(s) 20. Stake 20 may have an outer perimeter which is configured to slide and fit within opening 16. In further embodiments, stake 20 may include an insertion stop 20a, such that the stake 20 may be inserted into opening 16 up to insertion stop 20a, and held in place to facilitate load securement. In embodiments, strap hook opening(s) 14 may be configured to receive straps 24 and/or hooks 22, as shown in the figures. In some embodiments, stakes 20 may alternately be inserted into openings 14 and straps 24 and hooks 22 may be inserted into openings 16.

According to various embodiments, stakes 20, straps 24, and/or hooks 22 may be used for securement of cargo 26 to the trailer deck. Additionally, outer rail section 10c may provide impact protection from collisions, e.g. forklift accidents, and the like.

In some embodiments, rub rail 10 may have a rectangular "C" shaped configuration, as shown in the figures. To this end, inner rail contact section 10a may comprise upper and lower vertical walls; mid rail section 10b may comprise upper and lower horizontal walls; and outer rail section 10c may comprise a vertical wall. The upper vertical wall of contact section 10a may extend downwards from the upper horizontal wall of mid rail section 10b, and the lower vertical wall of contact section 10a may extend upwards from the lower horizontal wall of mid rail section 10b. The upper horizontal wall of mid rail section 10b may extend from a top end of the vertical wall of outer rail section 10c, and the lower horizontal wall of mid rail section 10b may extend from a bottom end of the vertical wall of outer rail section 10c. In embodiments, the upper and lower vertical walls of contact section 10a may each extend a span of less than about 30%, or less than about 25%, or less than about 20%, or less than about 10% of the vertical wall of the outer rail section 10c. In some embodiments, the upper and lower vertical walls of section 10a may each extend to a span of about 15% of the vertical wall of the outer rail section 10c.

Figure 6:
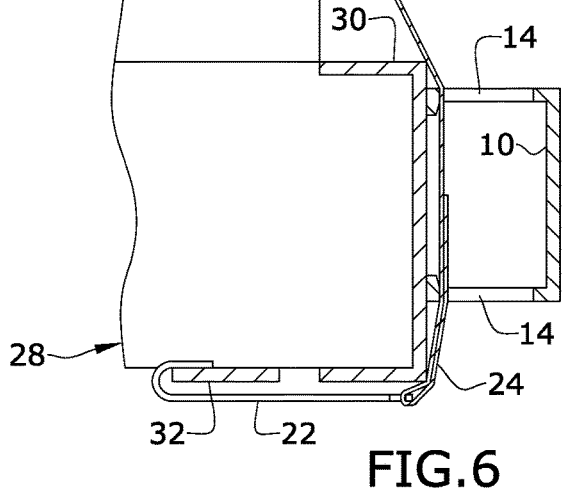
FIG. 6 is a section view taken along line 6-6 from FIG. 2.
Figure 7:
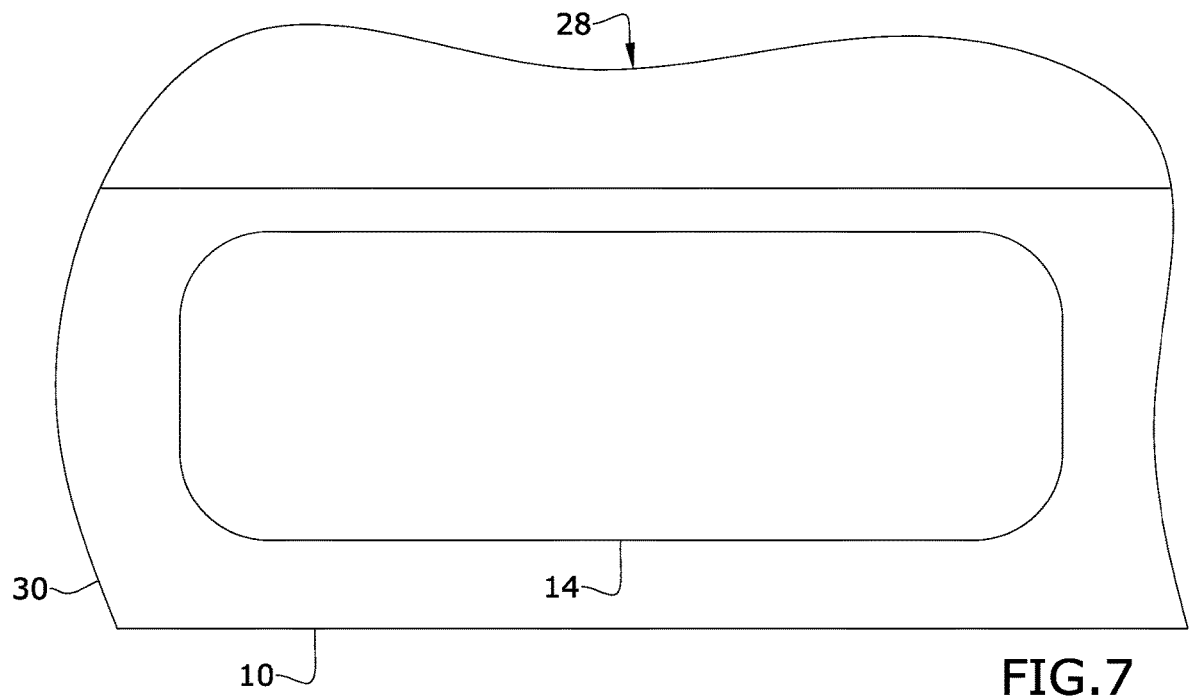
FIG. 7 depicts a top view of an opening for straps, hooks and/or stakes, which may be incorporated in the continuous contact rub rail of FIG. 1, according to certain embodiments.
Figure 8:
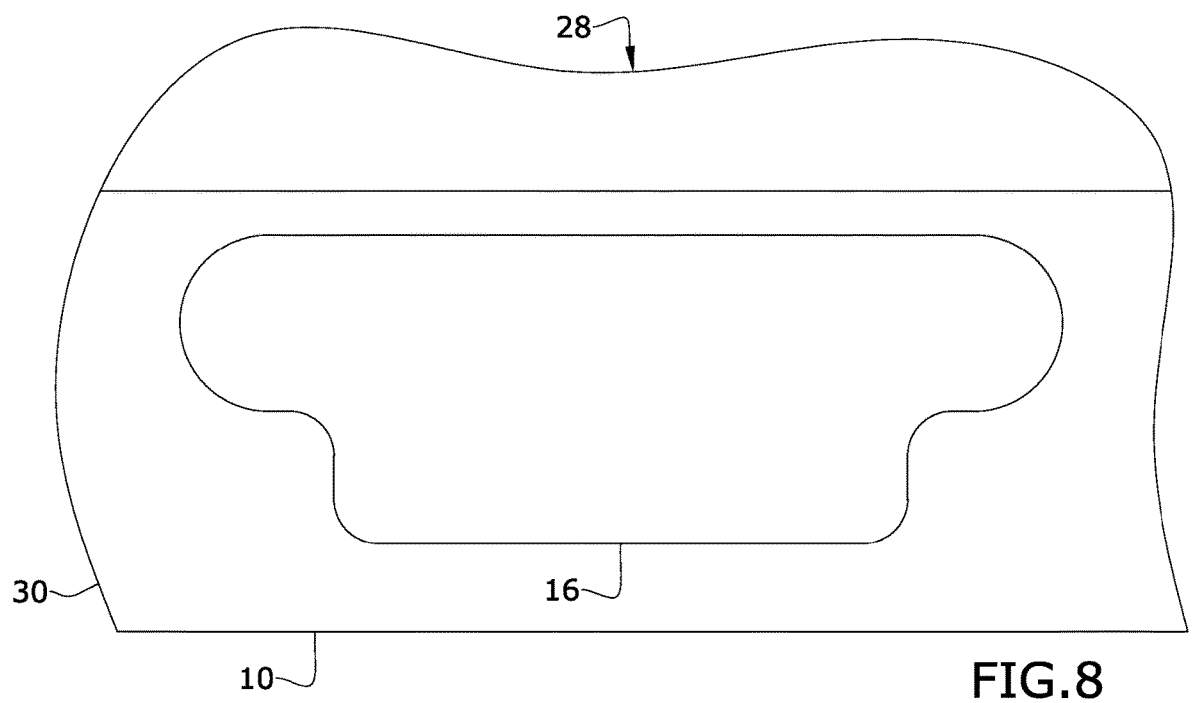
FIG. 8 depicts a top view of an opening for straps, hooks and/or stakes, which may be incorporated in the continuous contact rub rail of FIG. 1, according to certain embodiments.

In embodiments, openings 14 and/or openings 16 may be provided in both the upper and lower horizontal walls of mid rail section 10b, wherein an opening in the upper horizontal wall may be congruent to, and in alignment with an opening in the lower horizontal wall. As such, stakes 20 may be inserted through openings 16 in the upper and lower horizontal walls of mid rail section 10b. Additionally, as best depicted in FIG. 6, hook 22 may engage opening 14 in the upper horizontal wall of mid rail section 10b, and extend along the inner vertical wall of section 10a, wherein strap 24 may be coupled to the bottom of the hook, and may pass diagonally through openings 14 in the lower and upper horizontal walls, for securing cargo 26 to the deck of trailer 28.

In embodiments, fender cut outs 18a may be made at the vertical wall of outer rail section 10c to accommodate fender(s) 18, the lower horizontal wall of mid rail section 10b, and/or lower vertical wall of contact section 10a. Additionally, end caps 12 may have a rectangular or square configuration to fit into the ends of the rub rail, and cap off the ends of the "C" frame formation.

Other embodiments for the disclosed rub rail may be employed without departing from the inventive concept. For example, section 10a may comprise a single vertical wall that may extend between upper and lower walls of section 10b, according to various embodiments.

In embodiments, a user may install the disclosed rub rail onto a trailer deck frame by horizontally welding the inner section of the rub rail to the deck frame. Additionally, the welding may be performed as a stitch weld through each opening 14 and 16 of both the upper and lower horizontal leg 10b. The horizontal welding and continuous contact directly to the deck frame provides a rub rail system which is more robust and reliable in comparison to rub rails that may employ non-continuous contact and/or circular welds (e.g. to stake pockets and/or pipe spools coupled along the frame). The disclosed system is further easier to repair than rub rails that are integral with the deck frame. The disclosed rub rail system may further be used for other applications which may involve securement or tying down a load onto a platform.

It shall be appreciated that the components of the continuous contact rub rail(s) described herein may comprise any alternative known materials in the field and be of any color, size and/or dimensions. It shall be appreciated that the components of the continuous contact rub rail(s) described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Terms such as 'substantially,' as used herein may indicate at least 85%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A rub rail method comprising:
   installing a rub rail along a frame of a trailer deck, the frame of the trailer deck comprising a vertical outer wall formed around the trailer deck, the rub rail comprising:
   an inner rail contact section;
   a mid rail section coupled to said inner rail contact section; and
   an outer rail section coupled to said mid rail section,
   wherein said inner rail contact section comprises at least one vertical wall; and
   attaching said at least one vertical wall of said inner rail contact section to said vertical outer wall of the trailer deck to couple the rub rail to the frame of the trailer deck,
   wherein the rub rail is a stand-alone piece, and wherein an attachment contact section between the rub rail and the frame of the trailer deck is limited to the at least one vertical wall of the inner rail contact section of the rub rail and the vertical outer wall of the trailer deck, wherein said inner rail contact section comprises upper and lower vertical walls, said mid rail section comprises upper and lower horizontal walls, and said outer rail section comprises a vertical wall, wherein the upper vertical wall of said inner rail contact section extends downwards from the upper horizontal wall of said mid rail section, the lower vertical wall of said inner rail contact section extends upwards from the lower horizontal wall of said mid rail section, the upper horizontal wall of said mid rail section extends from a top end of the vertical wall of said outer rail section, and the lower horizontal wall of said mid rail section extends from a bottom end of the vertical wall of said outer rail section, and wherein the upper and lower vertical walls of the inner rail contact section are welded to said vertical outer wall of the trailer deck frame.

2. The rub rail method of claim 1, wherein said at least one vertical wall of said inner rail contact section is attached by horizontal welding to said vertical outer wall of the frame of the trailer deck to provide a continuous contact attachment between the inner rail contact section and vertical outer wall of frame of the trailer deck.

3. The rub rail method of claim 1, wherein the rub rail further comprises openings formed in both the upper and lower horizontal walls of said mid rail section, said openings configured for insertion of at least one of stakes, straps, and hooks.

4. The rub rail method of claim 3, wherein said inner rail contact section, mid rail section, and outer rail section form an integral body, which is a hollow frame.

5. The rub rail method of claim 1, wherein the rub rail is isolated from a top surface of the trailer deck when installed along the frame of the trailer deck.

* * * * *